United States Patent
Kleinschmidt et al.

(10) Patent No.: US 6,608,848 B2
(45) Date of Patent: Aug. 19, 2003

(54) METHOD AND APPARATUS FOR WAVELENGTH CALIBRATION

(75) Inventors: Jürgen Kleinschmidt, Weissanfels (DE); Uwe Stamm, Göttingen (DE); Klaus Vogler, Göttingen (DE); Peter Lokai, Bovenden (DE)

(73) Assignee: Lambda Physik AG, Goettingen (DE)

(*) Notice: Subject to any disclaimer, the term of this patent is extended or adjusted under 35 U.S.C. 154(b) by 89 days.

(21) Appl. No.: 09/849,600

(22) Filed: May 4, 2001

(65) Prior Publication Data

US 2002/0012368 A1 Jan. 31, 2002

Related U.S. Application Data

(63) Continuation of application No. 09/679,592, filed on Oct. 4, 2000, now Pat. No. 6,272,158, which is a continuation of application No. 09/416,344, filed on Oct. 12, 1999, now Pat. No. 6,160,832, which is a continuation-in-part of application No. 09/088,622, filed on Jun. 1, 1998, now abandoned, and a continuation-in-part of application No. 09/136,275, filed on Aug. 19, 1998, now abandoned.

(51) Int. Cl.$^7$ .................................................. H01S 3/13
(52) U.S. Cl. ............................... 372/32; 372/57; 372/20
(58) Field of Search ................ 372/32, 20, 57

(56) References Cited

U.S. PATENT DOCUMENTS

| | | | |
|---|---|---|---|
| 3,806,829 A | 4/1974 | Duston et al. | 331/94.5 |
| 4,016,504 A | 4/1977 | Klauminzer | 331/94.5 |

(List continued on next page.)

FOREIGN PATENT DOCUMENTS

| | | | | |
|---|---|---|---|---|
| DE | P 40 29 687 A1 | 9/1990 | ........... | H01S/3/082 |
| DE | 42 25 781 | 8/1992 | ........... | H01S/3/08 |
| DE | 41 14 407 A1 | 11/1992 | | |
| DE | 298 22 090 U1 | 2/1999 | ........... | H01S/3/08 |
| DE | 298 22 082.2 | 2/1999 | ........... | H01S/3/08 |
| EP | 0 472 727 B1 | 11/1990 | ......... | H01S/3/1055 |

(List continued on next page.)

OTHER PUBLICATIONS

Masakatsu Okada et al., "Electronic Tuning of Dye Lasers by an Electrooptic Birefringent Fabry—Perot Etalon," *Optics Communications*, vol. 14, No. 1, pp. 4–7, 1975.

(List continued on next page.)

*Primary Examiner*—Leon Scott, Jr.
(74) *Attorney, Agent, or Firm*—Sierra Patent Group, Ltd.; Andrew V. Smith

(57) ABSTRACT

A wavelength calibration system determines an absolute wavelength of a narrowed spectral emission band of an excimer or molecular laser system. The system includes a module including an element which optically interacts with a component of an output beam of the laser within the tunable range of the laser system around the narrowed band. An inter-level resonance is detected by monitoring changes in voltage within the module, or photo-absorption is detected by photodetecting equipment. The absolute wavelength of the narrowed band is precisely determinable when the optical transitions occur and are detected. When the system specifically includes an ArF-excimer laser chamber, the module is preferably a galvatron containing an element that photo-absorbs around 193 nm and the element is preferably a gas or vapor selected from the group consisting of arsenic, carbon, oxygen, iron, gaseous hydrocarbons, halogenized hydrocarbons, carbon-contaminated inert gases, germanium and platinum vapor. When the system specifically includes $F_2$-laser chamber, the module is preferably a galvatron containing an element that photo-absorbs around 157 nm and the element is preferably a gas or vapor selected from the group consisting of selenium, bromine and silicon. The module is alternatively a purge chamber configurable for purging with a photo-absorbing gas.

43 Claims, 6 Drawing Sheets

U.S. PATENT DOCUMENTS

| | | | |
|---|---|---|---|
| 4,309,671 A | 1/1982 | Malyon | 331/94.5 S |
| 4,319,843 A | 3/1982 | Gornall | 356/346 |
| 4,331,937 A | 5/1982 | Brown et al. | 372/74 |
| 4,348,647 A | 9/1982 | Nighan et al. | 372/74 |
| 4,404,366 A | 9/1983 | Boguslaski et al. | 536/18.1 |
| 4,435,808 A | 3/1984 | Javan | 372/11 |
| 4,468,773 A | 8/1984 | Seaton | 372/32 |
| 4,513,422 A | 4/1985 | Buholz | 372/29 |
| 4,558,952 A | 12/1985 | Kulesh et al. | 356/349 |
| 4,592,043 A | 5/1986 | Williams | 370/3 |
| 4,611,270 A | 9/1986 | Klauminzer et al. | 364/183 |
| 4,823,354 A | 4/1989 | Znotins et al. | 372/57 |
| 4,829,536 A | 5/1989 | Kajiyama et al. | 372/57 |
| 4,856,018 A | 8/1989 | Nozue et al. | 372/98 |
| 4,905,243 A | 2/1990 | Lokai et al. | 372/32 |
| 4,911,778 A | 3/1990 | Barnoach | 156/466 |
| 4,914,662 A | 4/1990 | Nakatani et al. | 372/32 |
| 4,926,428 A | 5/1990 | Kajiyama et al. | 372/20 |
| 4,975,919 A | 12/1990 | Amada et al. | 372/33 |
| 5,025,445 A | 6/1991 | Anderson et al. | 372/20 |
| 5,081,635 A | 1/1992 | Wakabayashi et al. | 372/57 |
| 5,095,492 A | 3/1992 | Sandstrom | 372/92 |
| 5,142,543 A | 8/1992 | Wakabayashi et al. | 372/32 |
| 5,144,632 A | 9/1992 | Thonn | 372/33 |
| 5,150,370 A | 9/1992 | Furuya et al. | 372/106 |
| 5,198,872 A | 3/1993 | Wakabayashi et al. | 356/352 |
| 5,218,421 A | 6/1993 | Wakabayashi et al. | 356/352 |
| 5,226,050 A | 7/1993 | Stark et al. | 356/73 |
| 5,307,364 A | 4/1994 | Turner | 372/60 |
| 5,373,515 A | 12/1994 | Wakabayashi et al. | 372/20 |
| 5,404,366 A | 4/1995 | Wakabayashi et al. | 372/29 |
| 5,420,877 A | 5/1995 | Sandstrom | 372/34 |
| 5,450,207 A | 9/1995 | Fomenkov | 356/416 |
| 5,450,436 A | 9/1995 | Mizoguchi et al. | 372/59 |
| 5,479,431 A | 12/1995 | Sobottke et al. | 372/92 |
| 5,559,816 A | 9/1996 | Basting et al. | 372/27 |
| 5,596,596 A | 1/1997 | Wakabayashi et al. | 372/102 |
| 5,642,374 A | 6/1997 | Wakabayashi et al. | 372/57 |
| 5,684,822 A | 11/1997 | Partlo | 372/95 |
| 5,748,316 A | 5/1998 | Wakabayashi et al. | 356/352 |
| 5,761,236 A | 6/1998 | Kleinschmidt et al. | 372/100 |
| 5,764,678 A | 6/1998 | Tada | 372/57 |
| 5,771,094 A | 6/1998 | Carter et al. | 356/326 |
| 5,802,094 A | 9/1998 | Wakabayashi et al. | 372/57 |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,867,514 A | 2/1999 | Anderson | 372/38 |
| 5,898,725 A | 4/1999 | Fomenkov et al. | 372/102 |
| 5,901,163 A | 5/1999 | Ershov | 372/20 |
| 5,917,849 A | 6/1999 | Ershov | 372/102 |
| 5,946,337 A | 8/1999 | Govorkov et al. | 372/92 |
| 5,970,082 A | 10/1999 | Ershov | 372/102 |
| 5,978,391 A | 11/1999 | Das et al. | 372/20 |
| 5,978,394 A | 11/1999 | Newman et al. | 372/32 |
| 5,978,409 A | 11/1999 | Das et al. | 372/100 |
| 5,982,800 A | 11/1999 | Ishihara et al. | |
| 5,991,324 A | 11/1999 | Knowles et al. | 372/57 |
| 6,014,398 A | 1/2000 | Hofmann et al. | 372/60 |
| 6,028,879 A | 2/2000 | Ershov | 372/57 |
| 6,061,129 A | 5/2000 | Ershov et al. | 356/328 |
| 6,061,382 A | 5/2000 | Govorkov et al. | 372/101 |
| 6,078,599 A | 6/2000 | Everage et al. | 372/20 |
| 6,081,542 A | 6/2000 | Scaggs | 372/70 |
| 6,094,448 A | 7/2000 | Fomenkov et al. | 372/102 |
| 6,154,470 A | 11/2000 | Basting et al. | 372/19 |
| 6,157,662 A | 12/2000 | Scaggs et al. | 372/60 |
| 6,160,831 A | 12/2000 | Kleinschmidt et al. | 372/57 |
| 6,160,832 A * | 12/2000 | Kleinschmidt et al. | 372/32 |
| 6,163,559 A | 12/2000 | Watson | 372/102 |
| 6,219,368 B1 | 4/2001 | Govorkov | 372/59 |
| 6,243,163 B1 | 6/2001 | Wakabayashi et al. | 356/326 |
| 6,243,170 B1 | 6/2001 | Ershov | 356/519 |
| 6,240,110 B1 | 7/2001 | Leinhos et al. | 372/57 |
| 6,269,110 B1 * | 7/2001 | Leinhos et al. | 372/32 |
| 6,272,158 B1 * | 8/2001 | Kleinschmidt et al. | 372/32 |
| 6,285,701 B1 | 9/2001 | Albrecht et al. | 372/57 |
| 6,404,795 B1 * | 6/2002 | Leinhos et al. | 372/57 |
| 2001/0013933 A1 | 8/2001 | Smith et al. | 356/454 |
| 2002/0003817 A1 * | 1/2002 | Lokai et al. | 372/20 |
| 2002/0012368 A1 * | 1/2002 | Kleinschmidt et al. | 372/32 |

FOREIGN PATENT DOCUMENTS

| | | | | |
|---|---|---|---|---|
| EP | 0 570 243 A1 | 5/1993 | | H01S/3/139 |
| EP | 0 454 399 B1 | 9/1995 | | H01S/3/137 |
| EP | 0 855 811 A2 | 7/1998 | | H04B/10/145 |
| EP | 0 875 743 A1 | 11/1998 | | G01J/9/02 |
| EP | 0 867 989 B1 | 9/1999 | | H01S/3/1055 |
| EP | 1 063 503 A1 | 6/2000 | | G01J/9/02 |
| JP | 2-631554 | 4/1997 | | H01S/3/1055 |
| WO | WO 96/07224 | 3/1996 | | H01S/3/13 |
| WO | WO 01/18923 A1 | 3/2001 | | H01S/3/22 |
| WO | WO 01/46658 A1 | 6/2001 | | G01J/3/18 |

OTHER PUBLICATIONS

R.B. Green et al., "Galvanic Detection of Optical Absorptions in a Gas Discharge," *Applied Physics Letters*, vol. 29, No. 11, pp. 727–729, Dec. 1, 1976.

R.A. Keller et al., "Opto–galvanic Spectroscopy in a Hollow Cathode Discharge," *J. Opt. Soc. Am.*, vol. 69, No. 5, pp. 738–742, May 1979.

Richard A. Keller et al., Atlas for Optogalvanic Wavelength Calibration, *Applied Optics*, vol. 19, No. 6, pp. 836–837, Mar. 15, 1980.

Norman J. Dovichi, et al., "Use of the Optogalvanic Effect and the Uranium Atlas for Wavelength Calibration of Pulsed Lasers," *Applied Optics*, vol. 21, No. 8, pp. 1468–1473, Apr. 12, 1982.

P. Camus, "Atomic Spectroscopy with Optogalvanic Detection," *Journal De Physique*, (Paris) 11C7, pp. C7–87–106, Nov. 1983.

F. Babin et al., "Ultraviolet Optogalvanic Laser Spectroscopy of Iron for Reference Wavelengths," *Optics Letters*, vol. 12, No. 7, pp. 468–470, Jul. 1987.

R.S. Sandstrom, "Argon Fluoride Excimer Laser Source for Sub–0.25mm Optical Lithography," *Optical/Laser Microlithography IV*, vol. 1463, pp. 610–616, 1991.

Emara, S., "Wavelength Shifts in $Hg^{198}$ as a Function of Temperature," *Journal of Research of the National Bureau of Standards—A. Physics and Chemistry*, vol. 65A, No. 6, Nov.–Dec. 1961, pp. 473–474.

J. Caplan, "Temperature and Pressure Effects on Pressure–Scanned Etalons and Gratings," *Applied Optics*, vol. 14, No. 7, Jul. 1975, pp. 1585–1591.

H. H. Barrett, et al., "Retroreflective arrays as approximate phase conjugators," *Opt. Lett. 4.* vol. 4, No. 6, 1979, pp. 190–192.

N. Tan–No, et al., "Dispersion–free amplification and oscillation in phase–conjugate four–wave mixing in an atomic vapor doublet," *IEEE J. Quantum Electronics*, 16, 1980, pp. 147–153.

W. Demtröder, *Laser Spectroscopy*, published by Springer, Berlin 1981, Chapter 4: Spectroscopic Instumentation, pp. 99–221.

M.D. Levenson, et al., "Projection photolithography by wave–front conjugation," *J. Opt. Soc. Am,* vol. 71, No. 6, Jun. 1981, pp. 737–743.

T.R. Hicks, "Tunable Fabry–Perot Filters," *Opt. Eng.,* vol. 20, No. 6 (1981) pp. 806–514.

D.L. Jordan, et al., "Experimental Measurements of Non–Gaussian Scattering by a Fractal Diffuser," *Applied Physics B.,* vol. 31, 1983, pp. 179–186.

R. Martinez–Herrero, et al., "Transmitted Amplitude by a Fabry–Perot Interferometer with Random Surface Defects," *Applied Optics,* vol. 24, No. 3, Feb. 1, 1985,pp. 315–316.

D.P. Mahapatra, et al., "Exact Evaluation of the Transmittal Amplitude for a Fabry–Perot Interferometer with Surface Defects," *Applied Optics,* vol. 25, No. 10, May 26, 1986, pp. 1646–1649.

Andersson, M., et al., "Compressible Favry–Perot Refractometer," *Applied Optics,* vol. 26, No. 22, Nov. 15, 1987, pp. 4835–4840.

D.R. Hall, et al., *The Physics and Technology of Laser Resonator,* 1989, pp. 1–20, 94–104, 117–131, 143–153, 176–189, 220–245.

R.K. Tyson, *Principles of Adaptive Optics, 2$^{nd}$ Edition,* 1991, Chapter 5: Wavefront Sensing, pp. 121–202.

Sansonetti, J.E., et al., "Atlas of the Spectrum of a Platinum/ Neon Hollow–Cathode Reference Lamp in the Region 1130–4330 A", *Journal of Research of the National Institute of Standards and Technology,* vol 97, No. 1, Jan.—Feb. 1992, 1–211.

M. Kakehata, et al., "Output Characteristics of a Discharge–pumped Fe Laser (157nm) with an Injection–seeded Unstable Resonator," *J. Appl. Phys.,* vol. 74, No. 4, Aug. 15, 1993, pp. 2241–2246.

S. M. Hooker, et al., "Progress in Vacuum Ultraviolet Lasers," *Progress in Quantum Electronics,* vol. 18, 1994, pp. 227–274.

MacBride, et al., "Effect of Temperature Variation of FT–IR Spectomoter Stability," *Applied Spectroscopy,* 1997, vol. 51, No. 1, pp. 43–50.

Wakabayashi, et al., "Billion Level Durable ArF Excimer Laser with Highly Stable Ernergy," *SPIE 24$^{th}$ Annual International Symposium on Microlithography,* Santa Clara, Calif., May 14–19, 1999.

A. I. Ershov, et al., "Novel Metrology for Measuring Spectral Purity of KrF Lasers for Deep UV Lithography," *Proceedings of SPIE,* vol. 3677, Jun. 1999, pp. 611–620.

Sansonetti, et al., "Precision Measurement of Wavelengths Emitted by a Molecular Fluorine Laser at 157 nm," *Applied Optics,* vol. 40, No. 12, Apr. 20, 2001, pp. 1974–1978.

* cited by examiner

METHOD AND APPARATUS FOR WAVELENGTH CALIBRATION

PRIORITY

[This application is a Rule 1,53(b) Continuation of U.S. patent application Ser. No. 09/679,592, filed Oct. 4, 2000, now U.S. Pat. No. 6,272,158 Which is a Contintuation of U.S. patent application Ser. No. 09/416,344, filed Oct. 12, 1999, now U.S. Pat. No. 6,160,832, which is a Continuation-in-Part application claiming the benefit of priority to U.S. patent application Ser. No. 09/088,622, filed on Jun. 1, 1998, now abandoned, and to U.S. patent application Ser. No. 09/136,275, filed on Aug. 19, 1998, now abandoned.]

BACKGROUND OF THE INVENTION

1. Field of the Invention

The present invention relates to a wavelength calibration module and technique, and particularly to an absolute wavelength calibration module which optically absorbs at known wavelengths and detects such optical absorption when a narrowed emission band of an excimer or molecular laser is incident on the module.

2. Discussion of the Related Art

Excimer lasers emitting pulsed UV-radiation are becoming increasingly important instruments in specialized material processing. The KrF-excimer laser emitting around 248 nm and the ArF-excimer laser emitting around 193 nm are rapidly becoming the light sources of choice for photolithographic processing of integrated circuit devices (IC's). The $F_2$-laser is also being developed for such usage and emits light around 157 nm.

It is important for their respective applications to the field of submicron silicon processing that each of the above excimer laser systems become capable of emitting a narrow spectral band around a very precisely determined and finely adjustable absolute wavelength. Techniques for reducing bandwidths by special resonator designs to less than 100 pm, and in some cases to less than 1 pm, are well known. Techniques are also available for tuning and controlling central wavelengths of emission. However, most of these techniques do not accurately determine absolute wavelengths and only serve to relatively tune and control wavelengths. Moreover, even relative wavelength changes cannot be as precisely determined as is desired, using these techniques.

It is possible to roughly determine an absolute wavelength or a change in wavelength from a reference wavelength as a spectral band is tuned, when particular incremental settings of a spectrograph are calibrated to correspond to absolute wavelengths in conventional units, e.g., in nanometers. However, conventional techniques do not provide very precise absolute wavelength and incremental wavelength change information at any time. This is because a conventional spectrograph often must undergo a laborious conventional calibration technique. Moreover, optical drift and other optical, thermal and electronic phenomena produce uncertainty and imprecision at all times following the calibration procedure, including during operation of the system. Further, wavelength calibration is usually done externally to the operating beam path of the system using high resolution spectrographs in combination with spectral reference tools for wavelength calibration, e.g., spectral lamps emitting particular narrow lines. Therefore, very precise and temporally advantageous absolute wavelength determination and fine tuning methods are needed.

Specifically, it is desired to have absolute wavelength calibration techniques for UV-emitting excimer and molecular lasers having accuracies within a range of ±0.25 pm, while having tuning versatility comprising wavelength ranges from ±5 pm to greater than ±100 pm depending on properties of available illumination tools for IC production. There are available techniques for accurately determining the absolute wavelength of a narrow band KrF-excimer laser emission using narrow spectral absorption lines of certain elements to calibrate a high resolution spectrometer. Among these available techniques, atomic transition(s) of iron (Fe) at 248.327 and/or 248.4185 nm are used to detect absorption signals either by reduced optical transmission or using the opto-galvanic effect. See U.S. Pat. No. 4,823,354 to Znotins et al.; U.S. Pat. No. 5,450,207 to Fomenkov; F. Babin et al., Opt. Lett., v. 12, p. 486 (1987); See also R. B. Green et al., Appl. Phys. Lett., v. 29, p. 727 (1976) (describing galvanic detection of optical absorptions in a gas discharge for various gases including lithium (Li), sodium (Na), uranium (U) and barium (Ba)).

Babin et al. discloses using the opto-galvanic effect to determine the KrF-laser absolute emission wavelength. A galvatron having an anode and a cathode is set in the optical path of the laser beam. An Fe vapor fills the galvatron. A voltage is monitored between the cathode and anode. The emission wavelength of the laser is narrowed and tuned a range around 248 nm. When the wavelength of the beam impinging the Fe-vapor filled gas volume between the cathode and the anode corresponds to an atomic transition of Fe, a resonance between the levels causes a marked change in voltage between the anode and cathode. Since the absorption lines of Fe are well known and consistent, the absolute wavelength of the narrowed laser emission band is determinable.

Znotins et al. and Fomenkov each disclose using a photodetector to detect the intensity of light emitted from a KrF-laser. Znotins et al. discloses to use a galvatron having benzene vapor inside. Fomenkov discloses to use a galvatron having an Fe cathode inside. The cathode of Fomenkov gives off Fe vapor which fills the galvatron when a current is generated between the cathode and an associated anode. Light emitted from the KrF-laser traverses the gaseous benzene or iron medium of the galvatron before impinging the photodetector. When the wavelength corresponds to an atomic transition of the gas medium of the galvatron, the gas absorbs the light, and the intensity of light detected is reduced. Thus, the absolute wavelength of emission of the KrF-laser is determinable in also determinable in this alternative way.

The opto-galvanic effect described by Babin et al. and acknowledged by Fomenkov permits a very precise and reliable determination of an absolute emission wavelength of a KrF-excimer laser system. See U.S. Pat. No. 4,905,243 to Lokai et al. A known technique uses sealed hollow cathode lamps containing Fe-vapor in a Ne-buffer gas environment. See Hammamatsu Datasheet: Opto-Galvanic Sensor, Galvatron L 2783 Series, November 89, Japan. Thus, the Fe-lamp has become an important and reliable measuring tool for absolute wavelength calibration for KrF-lithography laser systems in the 248 nm spectral region.

SUMMARY OF THE INVENTION

It is desired to have absolute wavelength calibration capability for excimer and molecular fluorine laser systems, and particularly for ArF-lithography laser systems emitting in the 193 nm spectral region, as well as for $F_2$ lithography laser systems emitting in the 157 nm spectral region, having a precision of ±0.25 pm. It is further desired to have tuning versatility for ArF-laser systems in a range from around 192.5 to 194 nm, and more particularly from around 193.0 to 193.6 nm, while maintaining precise absolute wavelength calibration. It is also desired to have a calibration technique for an excimer or molecular fluorine laser system that is fast and reliable and is easily performed without complicated additional optical alignment of the beam path, such as one utilizing a spectral reference tool which is fixed and integrated into the optical beam path of the system.

The present invention encompasses these desired features and others by providing a system having a wavelength calibration module for measuring an absolute wavelength of a narrowed spectral emission band of an excimer or molecular laser such as an ArF-excimer laser system or a molecular fluorine ($F_2$) laser. The narrowed spectral emission interacts with the module at one or more specific absolute wavelengths and effects of the interactions are detected, when a component of the narrowed emission is directed through the module at the one or more absolute wavelengths. The absolute wavelength of the narrowed spectral emission is precisely determined when the effects of the interaction are detected. For the ArF-excimer laser system, the module contains an element having a level-transition line around 193 nm and is preferably a gaseous vapor selected from the group of materials consisting of arsenic, gaseous hydrocarbons, halogenized hydrocarbons, carbon contaminated inert gases, carbon, oxygen, germanium, and platinum vapor, as well as other metal vapors including iron. For the $F_2$-laser system, the module contains an element having a level-transition line around 157 nm and is preferably a gaseous vapor selected from the group of materials consisting of gaseous hydrocarbons, halogenized hydrocarbons, oxygen, selenium, bromine and silicon.

The present invention further encompasses the above desired features and others by preferably providing a galvatron having a cathode and an anode as the wavelength calibration module. Preferably, the narrowed emission is directed toward the galvatron and voltage changes are detected between the cathode and anode of the galvatron due to opto-galvanic resonance effects when the narrowed emission is tuned within the broadband ArF-excimer laser emission spectrum or within the $F_2$-laser emission spectrum. Alternatively, a photodetector is aligned to monitor the intensity of light traversing the gaseous medium of the galvatron as the wavelength of the light in tuned; the detected intensity showing marked reduction around absorption-transition lines of the gaseous medium. The absolute wavelength of the narrowed emission is then precisely determined anywhere within the broadband spectrum.

The system preferably further includes an ArF-excimer or molecular fluorine laser chamber and optical resonator, a spectral narrowing and tuning unit, and a detection and control unit for relative wavelength detection, control and tuning. The narrow spectral emission band of the ArF- or $F_2$-laser is directed through an output coupling mirror of the optical resonator and toward the wavelength calibration module.

In another embodiment, a wavelength calibration system is provided for measuring an absolute wavelength of a narrowed spectral emission band of an excimer or molecular laser. In this embodiment, the excimer or molecular laser is preferably selected from the group of lasers consisting of a KrF laser, an ArF laser and a $F_2$ laser. The alternative system includes a purge chamber filled with a photo-absorbing element enclosing optical elements of the system. The photo-absorbing element is preferably oxygen gas or iron metal vapors when the system includes an ArF-excimer laser chamber. Reduction in intensity are observed and measured when the narrowed spectral emission band of the laser is tuned through a photo-absorption line of the photo-absorbing element. The purge chamber is purgeable with an inert gas such as argon or nitrogen gas for converting the calibration system into a clean output laser beam enclosure, and vice-versa.

DETAILED DESCRIPTION OF THE PREFERRED EMBODIMENT

Figure 1A:
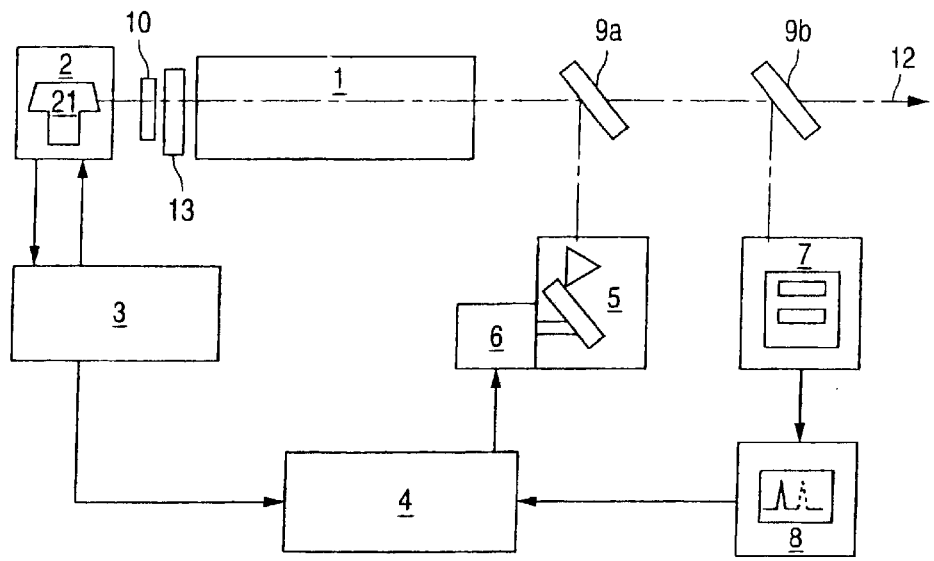
FIG. 1a schematically shows a narrow band ArF-excimer laser system according to a first embodiment of the present invention.

A narrow band ArF-excimer laser system according to a first embodiment of the present invention is shown in FIG. 1a and described below. An ArF-excimer laser chamber 1 emitting around 193 nm is surrounded by various optical and electrical components. The laser chamber 1 normally has tilted windows, e.g., at Brewster's angle. The laser system includes a resonator comprising a highly reflective mirror 10, a polarizer 13, a beam splitter 9a and a wavelength narrowing and tuning block 5. The system further includes a wavelength calibration system including a wavelength calibration module 2.

The discussion of the preferred embodiment with respect to the ArF-excimer laser applies similarly throughout to the molecular fluorine ($F_2$) laser, and when necessary, important differences will be described. The main difference for the purposes of the present invention is that the $F_2$-laser emits around 157 nm, and not around 193 nm. Thus, the wavelength calibration system for the $F_2$-laser will be sensitive to radiation around 157 nm, whereas that for the ArF-excimer laser system will be sensitive around 193 nm. Also, except where discussed with respect to wavelength calibration according to the present invention, species such as water vapor and oxygen that strongly photoabsorb around 157 nm will be substantially removed from the optical path of any 157 nm radiation, whereas such substantial removal may or may not be performed in the case of 193 nm radiation. In addition, various species will interact differently with incident 193 nm and 157 nm radiation.

The wavelength calibration module 2 contains or comprises an element 21 which has an energy level transition line or lines around 193 nm. An energy level transition line is a detected atomic or molecular transition between atomic, electronic or molecular energy states of an element 21. An optical transition is one caused, facilitated, or stimulated by interaction of the atom or molecule with a photon of light. Examples of interactions involving optical transitions include absorption, emission, Raman scattering, and stimulated emission.

Figure 2:
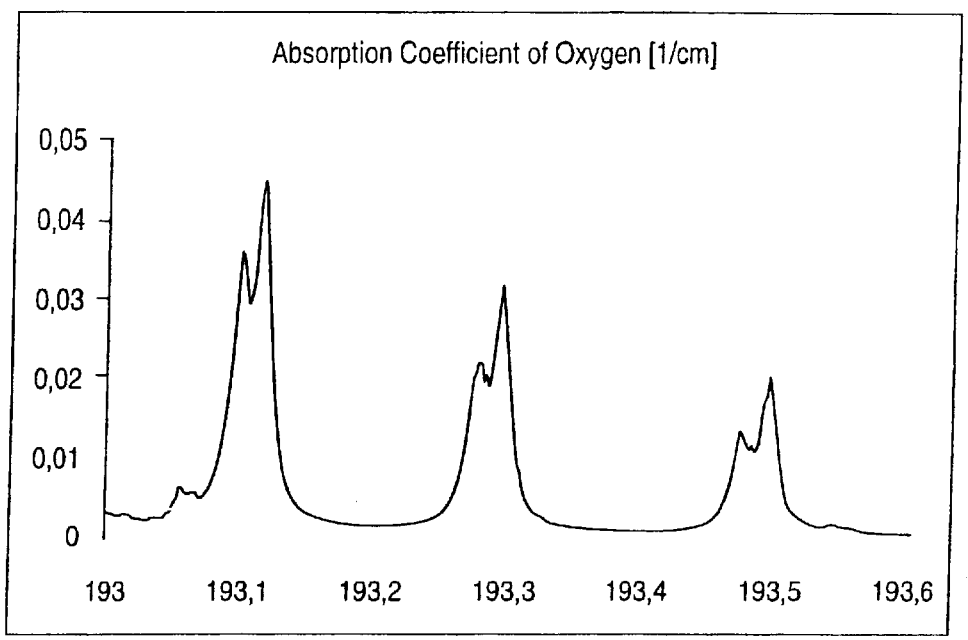
FIG. 2 is a graph showing absorption coefficients of oxygen versus wavelength in the 193 nm spectral region detected by the setup of the second embodiment of FIG. 1b.
Figure 3:
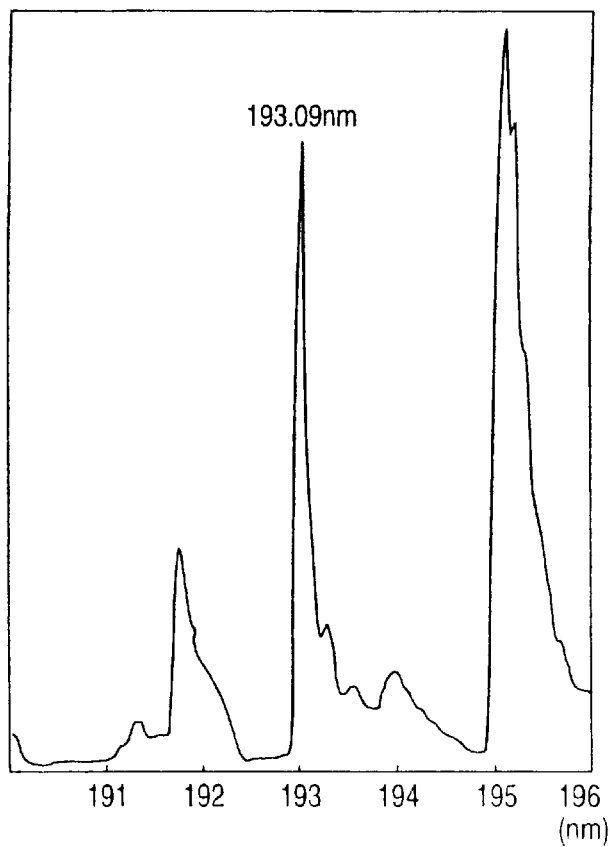
FIG. 3 is a graph showing absorption signal versus wavelength of a carbon hollow cathode lamp showing three absorption lines of neutral carbon.

The element 21 is preferably a gaseous vapor contained within a hollow cathode lamp 2. Vaporous species that may be used as the element 21 within the module 2 have lines around 193 nm. Some of those species include arsenic (193.696 nm), germanium (193.750 nm), carbon (193.0905 nm, and other lines), iron, platinum, gaseous hydrocarbons, halogenized hydrocarbons and carbon-contaminated inert gases. In addition, oxygen may be used as the element 21 and has several optical transition lines within the broadband emission spectrum of the ArF-laser. FIGS. 2 and 3 show exemplary graphs of photo-absorption coefficients of oxygen and carbon around 193 nm, respectively. Other species, in addition to those mentioned above, that have detectable level-transition lines within the broadband emission spectrum, such as that shown in FIG. 5 for an ArF-excimer laser, may be used as the element 21 contained within the wavelength calibration module 2. Quasi-transparent crystals and liquids that exhibit transition lines around 193 nm may also be used.

Figure 4:
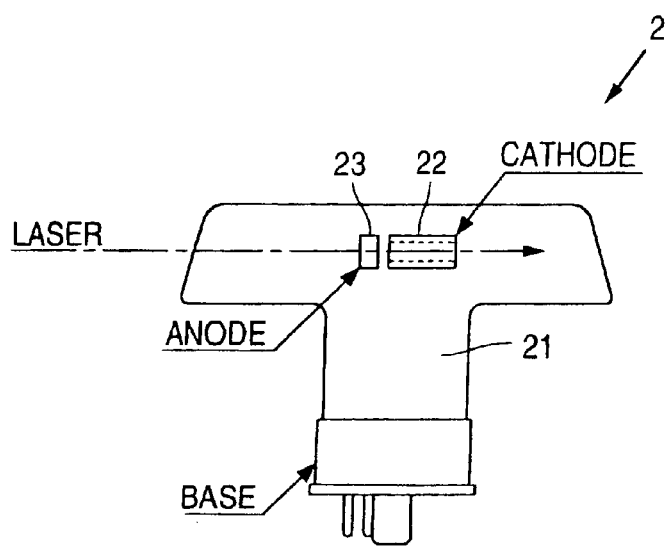
FIG. 4 shows a wavelength calibration module of the systems of FIGS. 1a and 1b.

FIG. 4 shows a galvatron which is an example of a wavelength calibration module 2. The galvatron is filled, and may be purged, with the element 21 in gaseous form. A laser beam portion may enter and/or exit the module through Brewster windows. A cathode 22 inside the galvatron may comprise the element 21 in solid form, and then release the element in gaseous form when a current is generated between the cathode 22 and its associated anode 23 inside the galvatron. Laser light from the laser chamber passes through the cathode 22 causing an inter-level resonance of the gaseous species when the wavelength of the laser light corresponds to an inter-level transition energy of the element 21. A marked voltage change is detected between the cathode 22 and the anode 23 when the laser light is tuned to these particular wavelength(s). Therefore, when the beam has a wavelength which corresponds to an energy level transition of the gaseous species 21 within the galvatron, a voltage change is detected and the absolute wavelength of the narrowed band is then determinable.

Figure 1B:
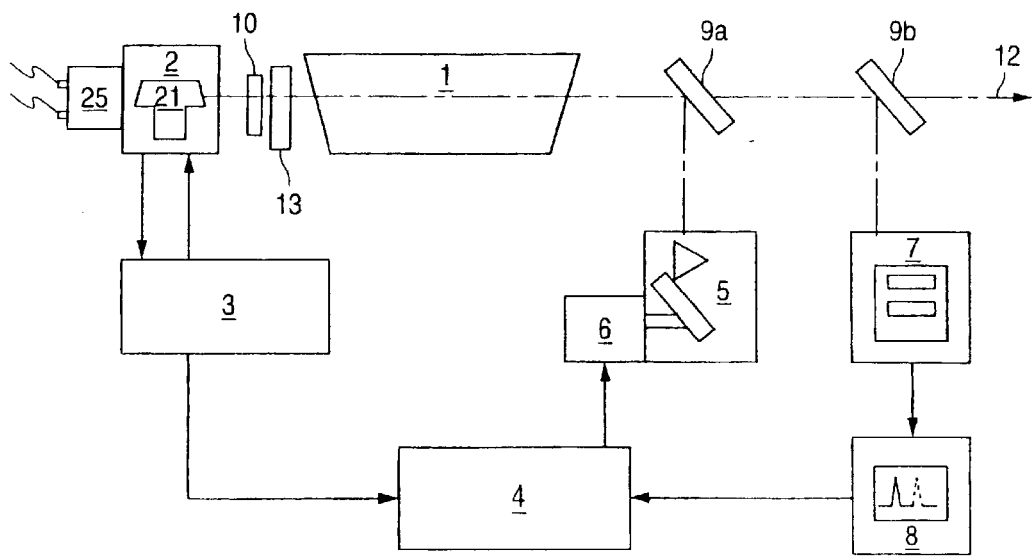
FIG. 1b schematically shows a narrow band ArF-excimer laser system according to a second embodiment of the present invention.

The galvatron may be used in a different way as shown in FIG. 1b. FIG. 1b includes the setup of FIG. 1a and additionally includes a photodetector arranged near the galvatron. In the system of FIG. 1b, the galvatron serves as a module 2 filled with the element 21 in gaseous form, as described above. The gaseous element 21 may be caused to fill the galvatron by forming the cathode 22 of the galvatron out of the element 21 in solid form, and running a current between the anode 23 and the cathode 22 of sufficient amplitude to sublimate the element 21.

The voltage across the anode and cathode are not monitored in the system of FIG. 1b, as they are with the system of FIG. 1a (i.e., for the purpose of detecting energy level resonances in species of the element 21 induced by the incident light). Instead, the intensity of the light as it passes through the galvatron is detected. By so doing, absorption lines of the element 21 are detected when the detected intensity is reduced below that which is expected at the wavelengths corresponding to the absorption lines. Since the absolute wavelengths of photoabsorption are known for the element 21, the absolute wavelength of the laser light is determinable.

For the $F_2$-laser emitting around 157 nm, different photoabsorbing species may be used. These species include selenium (157.530 nm), bromine (157.484 nm and 157.639 nm) and silicon. At the same time, arsenic, germanium, carbon and platinum are not used for wavelength calibration of the $F_2$-laser. The preferred species is bromine because the relative intensity of absorption of each of the 157.484 nm and 157.639 nm lines is very strong. For example, the relative intensity of absorption of each of these lines is as much as 100 to 200 times stronger than the selenium line.

Another advantage of bromine is its two lines, instead of one, allowing more versatility in the way absolute wavelength detection is performed for the $F_2$ laser, as is better understood after reading the descriptions below. The 157.484 nm absorption line of bromine is near the 157.523 nm emission line of the $F_2$ laser, while the 157.639 nm absorption line of bromine is near the 157.629 nm emission line of the $F_2$ laser. Even if one of the $F_2$ emission lines is selected to obtain a very narrow linewidth output beam (see, e.g., U.S. patent applications Nos. 09/317,695 and 09/317,527, which are each assigned to the same assignee as the present application, and which are hereby incorporated by reference into the present application), use of bromine allows absolute wavelength calibration to be performed when either of the two closely spaced $F_2$ laser emission lines is selected.

The wavelength of the laser light is determined from a knowledge of the energy band levels and transition probabilities of species of the gaseous element 21. That is, when the wavelength of the laser beam is tuned through the broadband spectrum of FIG. 5, the absolute wavelength of the beam is precisely determined each time it corresponds to an inter-level transition energy of the gaseous species 21 having a finite transition probability density. The absolute wavelengths of the transition level resonance modes are precisely and reliably known since they are determined by relative positions of adjacent or removed quantized energy states of the photo-absorbing element, and applicable transition-selection rules.

Figure 5:
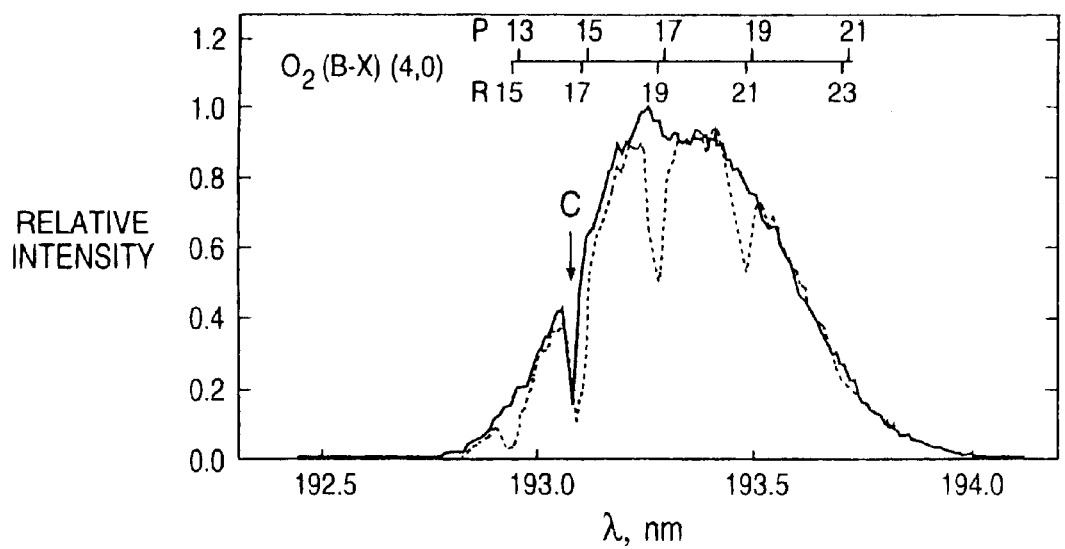
FIG. 5 shows a broadband ArF-laser emission spectrum indicating some absorption lines of oxygen and carbon.

The broadband ArF-excimer laser emission spectrum ranges between 192.5 and 194.0 nm, and is most intense between 193.0 and 193.6 nm. FIG. 5 also shows molecular absorption lines of oxygen, known as the Schumann-Runge bands, within the broadband ArF-excimer laser spectrum around 193 nm. Several of these absorption lines corresponding to rotational and vibronic transitions of oxygen molecules are observed within the broadband ArF-laser emission spectrum. In addition, the main carbon absorption line at 193.0905 nm is marked by "C" in the spectrum of FIG. 5.

Figure 6:
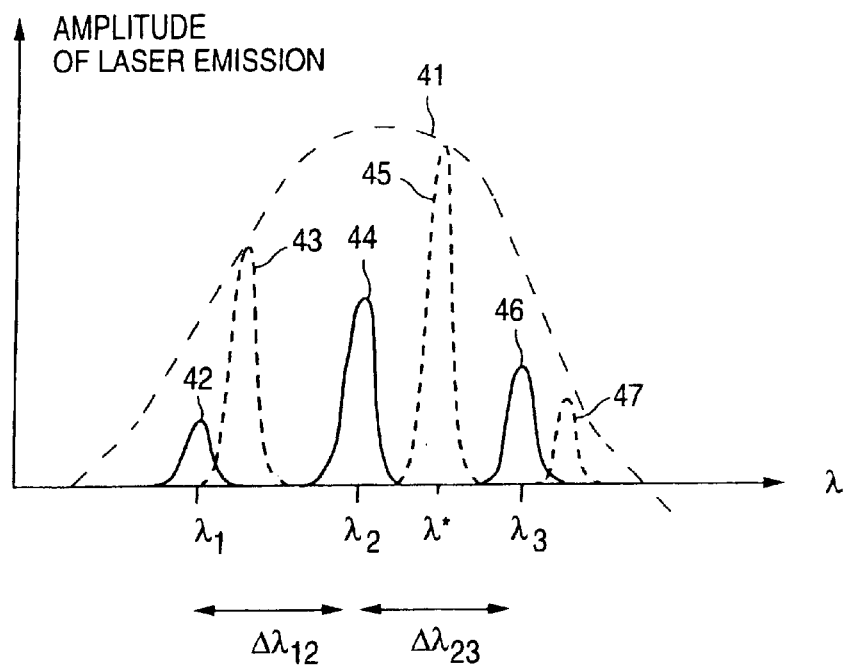
FIG. 6 is a graph illustrating a process for absolute wavelength calibration and tuning according to the preferred embodiment of FIG. 1.

FIG. 6 illustrates a method for tuning a narrowed emission band within the broadband spectrum of an excimer laser, using any embodiment of the laser and laser wavelength calibration system of the present invention. The spectrum may be specifically produced using the system of FIG. 1b, or the system of FIG. 7, to be described later. A broadband emission spectrum 41 is shown enveloping a broad range of wavelengths. Narrowed lines of emission 42–47 are shown within the broadband envelope 41. As expected, lines 42,44 and have reduced intensity from broadband 41 values because they are spectrally located at wavelengths where the element 21 is optically absorbing some of the laser intensity. Lines 43,45 and 47 have the intensity corresponding to the broadband (41) gain since the element 21 does not exhibit photo-absorption at those wavelengths. That is, without oxygen absorption in the exemplary graph of FIG. 6, the amplitude of the ArF-laser would follow the gain curve of the broadband emission spectrum.

The absolute wavelengths of the lines 42, 44 and 46 are directly determinable from well-known group theoretical and quantum mechanical calculations and experimental measurements of the absorption line(s) of the photo-absorbing element 21. The absolute wavelengths of the lines 43, 45 and 47 are indirectly determinable from a knowledge of the nearest absorption line(s) and the relative position of the line 43, 45 or 47 located therebetween. For example, if line 45 were located halfway between line 44, at _2, and line 46, at _3, then line 45 at_* would be located at the absolute wavelength of _*=_2+_(_3-_2). Alternatively, if the gaseous element 21 has only one absorption line, e.g., line 44, then the absolute wavelength of line 45 is determinable from a knowledge of the wavelength of line 44 and spectral features of the broadband 41, and the dispersion properties of the laser tuning element 5.

An ArF-excimer laser system including a wavelength calibration module as in FIGS. 1a and 1b includes the following electrical and optical components. A main control unit 4 communicates electronically with a motor drive 6 for a line-narrowing and tuning block 5, as well as with a display 8. The main control unit 4 is either a standard PC or an especially designed microprocessor unit for controlling the laser system.

The system further includes a signal processing and driving source 3 for the wavelength calibration module 2. The signal processing and driving source 3 provides an electrical supply for the wavelength calibration module 2. The signal processing and driving source further detects changes in current through the galvatron when irradiated with narrow bandwidth radiation matching a transition line of the gaseous element 21. These current changes can be quite small, and thus, precision circuitry is often used.

The display 8 receives its signal information from a wavelength monitoring component 7. The wavelength monitoring component 7 preferably includes a wavelength dispersion element and a photodetector. A typical layout includes a monitor etalon, some lenses and a photo diode array, wherein the etalon fringe pattern is imaged onto the diode array. When the wavelength of the laser is tuned by the motor drive 6, then the fringe pattern moves on the diode array and the wavelength shift can be measured.

On one end of the laser chamber 1, a light beam from the chamber 1 impinges a first beam splitter 9a which separates the beam into a component directed toward the line narrowing and tuning block 5, and a component which is unreflected. The line narrowing and tuning block is the line narrowing part of the resonator. The beam splitter 9a may be a polarizing beam splitter. The line narrowing and tuning block 5 can comprise one or more prisms and a high reflectivity mirror, when line narrowing to about 10 to 100 pm is desired. The line narrowing and tuning block 5 can comprise one or more prisms and a grating when line narrowing to less than 10 pm is desired. For further line narrowing, the line narrowing and tuning block can comprise one or more etalons.

The beam splitter 9a reflects some of the beam and most of the rest of the beam continues unreflected along the optical path. The unreflected portion impinges a second beam splitter 9b which separates the unreflected beam into a component directed toward the wavelength monitoring component 7, and a component which serves as the narrow band output beam 12.

At the other end of the chamber 1, a beam emerges from the chamber 1 and impinges a polarizer 13 and later impinges a resonator mirror 10. The preferred resonator of FIG. 1a is thus a polarization coupled resonator design. The polarizer 13 adjusts the polarization state of the laser radiation, which is particularly significant upon being directed onto the beam splitter 9a. The chamber 1 may also have one or more windows tilted at Brewster's angle with respect to the resonating beam. Alternatively, but not preferred, an output coupler may be used and, if used, would be inserted between the beam splitters 9a and 9b.

In the preferred arrangement, the resonator mirror 10 reflects most of the beam, but allows a small portion to continue unreflected, either by transmittance through the mirror 10 or by simply not impinging the mirror 10. Typically in the transmission case, the mirror 10 has a transmittance in the range from 0.1 to 1%. Specifically, the transmittance is preferably around 0.5%. The unreflected portion continues until it impinges the wavelength calibration tool 2.

Using this preferred arrangement, very precise absolute wavelength calibration can be performed. The calibration can be performed during operation of the system in its usual capacity, or during a short interim period between scheduled or unscheduled run times, without additional optical alignment, and may be performed at the factory.

Referring specifically to the system of FIG. 1a, an exemplary calibration procedure using the system of FIG. 1a is as follows. First, a coarse tuning of a narrow band emission of the ArF-laser 1 by the main control unit 4 is done via the spectral narrowing module 5, and the motor drive 6. The spectral narrowing module 5 is preferably a grating and is used for coarse tuning of the wavelength of the system. The wavelength position is observed by a wavelength monitoring module 7 preferably including an etalon. The fringe pattern is displayed on the display 8. Simultaneously, a signal of the potential difference between the cathode 22 and the anode 23 of the galvatron 2 is monitored by the signal processing unit 3. The main processing and data recording element 4 communicates with the signal processing and driving source 3. When a coincidence of the wavelength of the narrowed spectral beam with one of the optical transition lines of the element 21 occurs, as discovered by a marked voltage increase, a fine tuning across the known waveform of the line proceeds for determining more precisely the absolute position of the narrowed band. The position of the transition line corresponding to the spectral arrangement of the system, is recorded by the main control unit 4 for future reference. The wavelength may be moved away from the absorption line to a desired wavelength near the absorption line using the wavelength monitoring module 7 including the monitor etalon, and the information about the position of the absorption line relative to the fringe pattern produced by the etalon.

Figure 8:
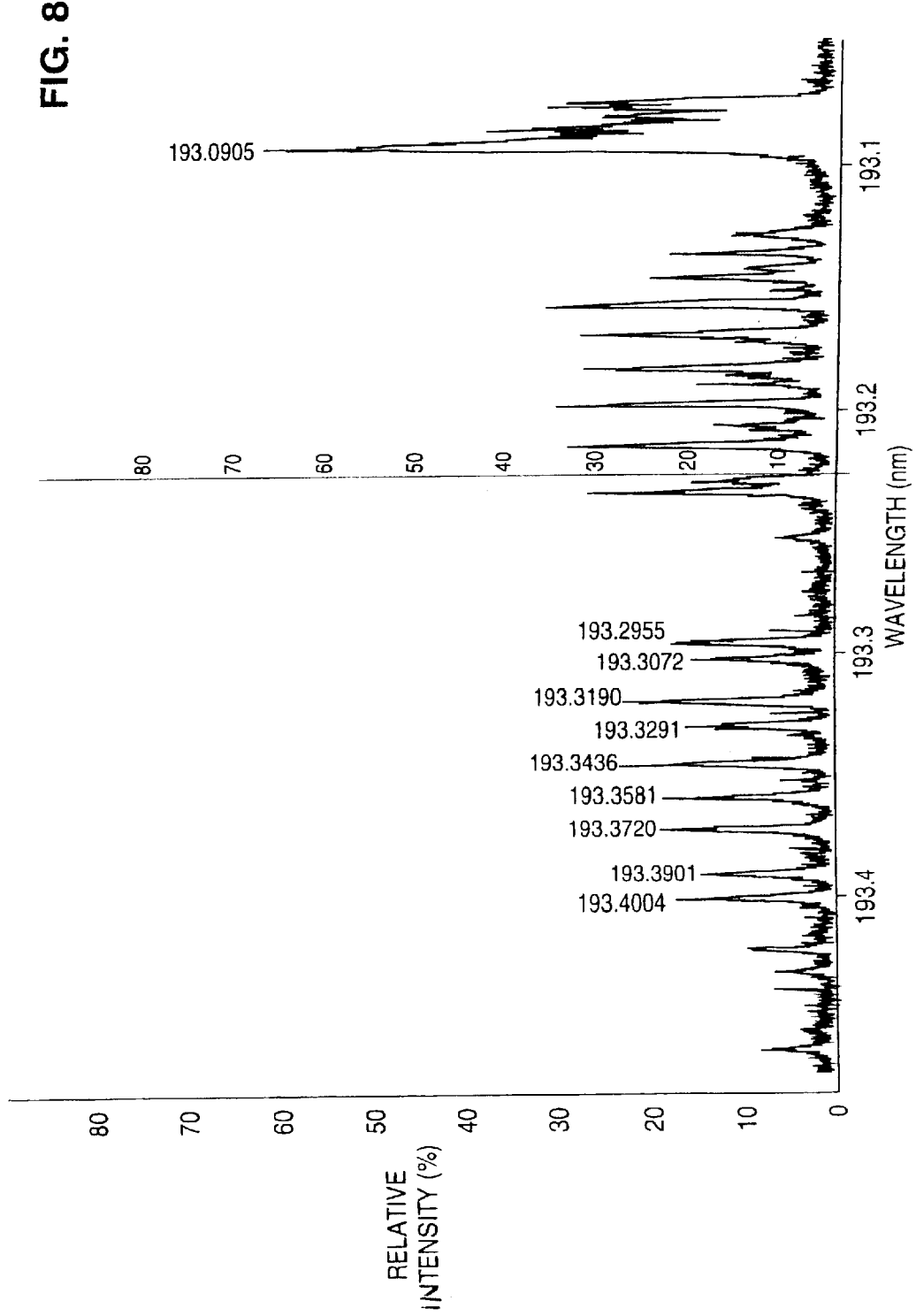
FIG. 8 shows carbon transition lines within the tuning range of an ArF-excimer laser, where the carbon hollow cathode is doped by oxides.

A modification in the design of the galvatron 2 can be performed which serves to enhance the wavelength of, e.g. the carbon photo-absorption line around 193.3 nm, shown in FIG. 3. The signal to noise ratio for the system may thus be enhanced by using special mixtures of buffer gases and evaporized elements and/or special cathode materials. An enhancement of usual absorption signals of the galvatron and/or a rise of weaker lines situated nearer the middle of the tuning range could be expected as seen in FIG. 8. With respect to FIG. 8, the carbon hollow cathode within the module used to obtain the spectrum is doped with oxides.

Alternatively, the arrangement of FIG. 1a may be modified to include a photodetector 25 near the galvatron and located such that the portion of laser light traversing the element 21, later impinges the photodetector. The preferred method is then modified using the embodiment of FIG. 1b, such that the voltage between the cathode 22 and the anode 23 are not monitored. A current is only generated between the cathode 22 and anode 23, if at all, to cause gaseous release of the solid element 21 comprising the cathode 22. The photodetector 25 monitors the intensity of the light emitted from the ArF-laser chamber after it has traversed the gaseous galvatron medium. At absorption lines of the gaseous species 21, the absolute wavelength of the light is determinable. Further to this alternative method, a hollow lamp may be filled with the gaseous element 21 in another way than release from a cathode 22, thus obviating the need for the cathode 22 and anode 23. The galvatron of the embodiment of FIG. 1a is then modified to be a chamber filled with the gaseous element 21 and arranged along the excimer-laser beam path between the discharge chamber 1 and the photodetector 25.

Figure 7:
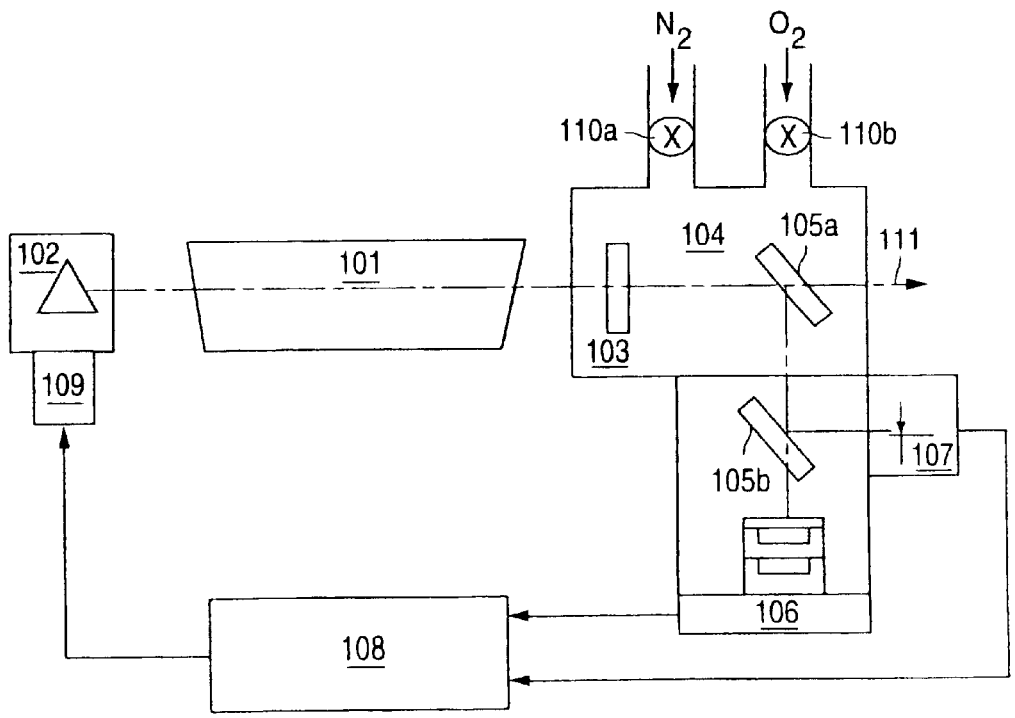
FIG. 7 schematically shows a narrow band ArF-excimer laser system according to a third embodiment of the present invention.

Referring to FIG. 7, a third embodiment of the present invention includes a tube or purge chamber 104 located along the beam path of the laser which is purgeable with a gaseous photo-absorbing element 21 which is preferably oxygen in this embodiment. Some hydrocarbon gases and halogenized hydrocarbon gases may be used instead of oxygen. Also, carbon contamination wherein carbon traces are combined with an inert gas is also substitutable for the oxygen gas. This purge chamber 104 is usually part of the system when it is in operation. The chamber 104 is, however, purged with an inert gas such as preferably $N_{2\text{-}gas}$ or Ar-gas, and not $O_2$-gas, when the system is in operation. The inert purging is performed to protect enclosed optical elements from corrosion and dust, and also, ironically, to avoid the very strong Schumann-Runge $O_2$-gas absorption which is so useful in performing absolute wavelength calibration. The purge chamber 104 is preferably only filled with $O_2$-gas when wavelength calibration is being performed. Using the purge chamber 104 in this way is advantageous because no special unit need be added to the laser system, or kept close by, for calibration purposes. This saves money and space within the laser housing as only a tank of oxygen need be purchased and kept alongside the nitrogen tank in the laboratory. Valuable time is also saved because no complicated arrangement need be set up or taken down to perform absolute wavelength calibration of the system.

The beam intensity is monitored using a wavelength monitor module 106, including a monitor etalon and a CCD detector for diagnostics, which measures decreased intensities corresponding to absorption lines of the element 21. Since the wavelengths of absorption of the element 21 are known or calculable, the absolute wavelength of emission of the laser system is precisely determinable. Oxygen may be used for this purpose as it is easily obtainable and storable in gaseous form, and the chamber 104 may be easily purged with it. Also, oxygen has multiple absorption lines within the broadband emission spectrum of FIG. 5, further facilitating wavelength determination. Again, another absorbing gaseous species such as a hydrocarbon gas, or a quasi-transparent solid or liquid cell may also be placed along the optical path if it has one or more absorption lines within the broadband spectrum of FIG. 3. Wavelength tuning is performed at the opposite end of the laser chamber 101 by a line narrowing block 102 including a dispersive element and a retroreflector.

A preferred arrangement of this third embodiment is shown in FIG. 7. It should be noted that a system of the third embodiment can include any of various laser systems, excimer or otherwise. Appropriate selection of purge gases is performed depending on the particular laser emission wavelength involved.

An ArF-excimer laser chamber 101 is shown in FIG. 7, emitting around 193 nm. A beam exits the chamber 101 at a first end and enters the purge chamber 104. The preferred purge chamber 104 is shown in FIG. 7 partially inside and partially outside of the laser resonator defined by elements 102 and 103. Alternatively, the purge chamber 104 may be external to the laser resonator. The purge chamber 104 may also be intracavity, or inside the laser resonator.

During a calibration process, the purge chamber 104 is filled with a photo-absorbing gas, e.g., $O_2$, that has at least one absorption line around 193 nm. During normal operation, the purge chamber is back-filled with $N_2$ gas to enable stable laser operation. Access to the purge chamber 104 by the $N_2$-gas and the $O_2$-gas tanks is separately controlled by valves 110a and 110b, respectively.

The beam impinges an output coupler 103 which reflects a large part of the intensity of the beam back along the optical path into the chamber 101. A portion of the beam incident on the output coupler 103 is transmitted and impinges a first beam splitter 105a. A portion of this beam is reflected and a portion is transmitted. The transmitted portion is the output beam 111 of the system. The portion of the beam reflected from the beam splitter 105a, is incident on a second beam splitter 105b. A component reflected from the second beam splitter is monitored by an energy monitor 107. Another component transmitted through the second beam splitter 105b enters a wavelength monitor module 106 including a monitor etalon and CCD diagnostics. The wavelength monitor module 106 communicates with a main processing and data acquisition unit 108.

A beam emerges from a second end of the laser chamber 101 opposite the first end from which the beam exits the laser chamber 101 and enters the purge chamber 104. This beam which exits the laser chamber 101 from the second end and impinges a line narrowing and tuning block 102 including dispersive elements and a retroreflector. The line narrowing and tuning block 102 is preferably a prism-dielectric mirror combination or a prism-grating combination. The prism dielectric mirror combination can be realized by two independent components or a back surface coated prism. In a preferred embodiment, a front surface of the prism is arranged at Brewster's angle to the incident beam. A motor drive 109 for wavelength tuning controls the dispersion angle of the prism, mirror or grating.

Figure 9:
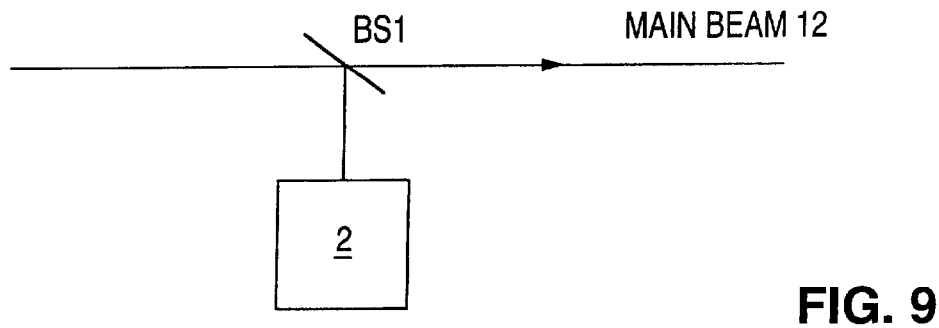
FIG. 9 schematically shows a beam splitter arrangement for reflecting a portion of the main beam towards a calibration module.

FIG. 9 illustrates a variation of either of the techniques described above with respect to FIGS. 1a and 1b. FIG. 9 shows the beam portion used for absolute wavelength calibration being diverted from the main beam using a beam splitter BS1. The beam splitter BS1 reflects a small portion of the intensity of the main beam toward the calibration module, including the photoabsorbing gas as described above.

A variation of the techniques described above with respect to FIGS. 1a, 1b and 9 is the following. Instead of using the optogalvanic effect, or measuring the absorption through the gas of the module using, e.g., a photodiode or photomultiplier tube, a microphone for photoacoustic detection may be used. The rest of the preferred method and apparatus is the same as described above.

Figure 10:
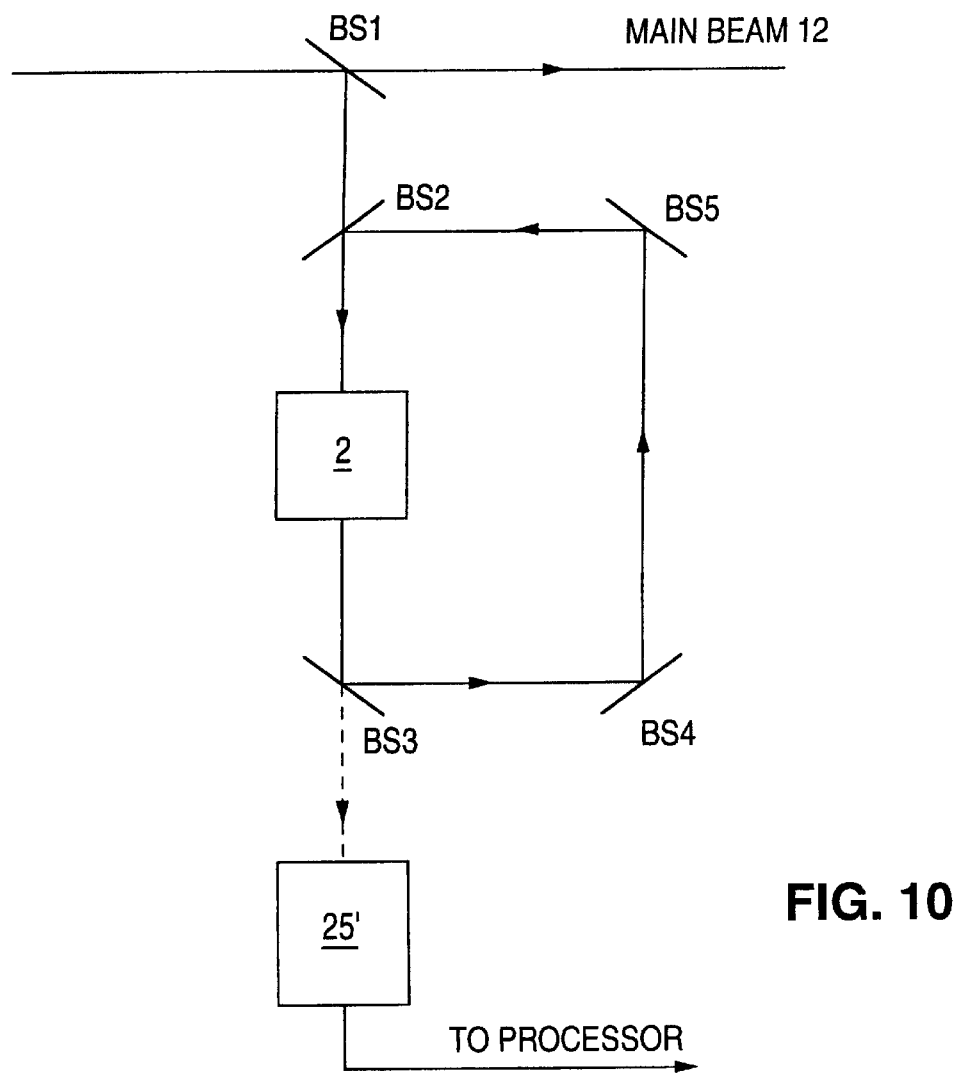
FIG. 10 schematically shows a beam splitter and mirror arrangement for reflecting a portion of the main beam towards a calibration module in a manner such that the beam portion passes through the calibration module more than once.

In addition, when the photoabsorption intensity is generally low, such as when a weak absorption line is used in any of the above techniques, the beam portion may be directed to pass through the gas of the calibration module 2 more than once, such as by an arrangement of mirrors and/or beam splitters BS1–BS5 such as are shown in FIG. 10. Any of optogalvanic, photoabsorption and photoacoustic detection techniques described above may be performed using this technique to enhance the detected signal intensity. When the photoabsorption technique is used, a portion of the split off beam can be output to a detector 25 positioned not to interfere with the cycling beam. Of course a processor receives the optogalvanic, photoabsorption or photoacoustic detection information and controls the laser wavelength accordingly.

The specific embodiments described in the specification, drawings, summary of the invention and abstract of the disclosure are not intended to limit the scope of any of the claims, but are only meant to provide illustrative examples of the invention to which the claims are drawn. The scope of the present invention is understood to be encompassed by the language of the claims, and structural and functional equivalents thereof.

What is claimed is:

1. A molecular fluorine laser system, comprising:
   a discharge chamber and a resonator and generating a narrow band output beam around 157 nm of a known absolute wavelength;
   a wavelength selection and tuning unit for selecting one of multiple closely-spaced characteristic molecular fluorine emission lines around 157 nm by optically suppressing non-selected lines of the multiple closely-spaced characteristic molecular fluorine emission lines, and for tuning a central wavelength of the narrow band output beam from the laser within the selected line;
   a wavelength calibration module permitting the wavelength of the narrow band output beam to be calibrated to a specific wavelength standard, said module coming at least one species for optically interacting with a beam portion in a region around 157 nm, for measuring effects of interaction of the beam portion with The at least one species when the narrow band output beam is scanned;
   a wavelength monitoring module for turning the wavelength to a desired wavelength after calibrating the wavelength monitoring module to the specific wavelength standard with the wavelength calibration module; and
   a processor for calibrating the wavelength of the narrow band output beam based on the measured effects of the interaction of the at least one species with the component of the output beam, and for controlling the tuning of the wavelength to the desired wavelength by controlling the wavelength selection and tuning unit according to information received from the wavelength monitoring module which is calibrated to the absolute wavelength standard, such that the wavelength is moved away from an interaction wavelength with the absolute wavelength standard based on information received from the wavelength monitoring module as the wavelength is Tuned to the desired wavelength within the selected line of the multiple closely-spaced characteristic molecular fluorine emission lines around 157 nm.

2. The laser system of claim 1, wherein said module further contains an inert gas.

3. The laser system of claim 1, wherein said electronics include a photodetector for measuring an intensity of the output beam after the output beam traverses a volume of the module including the optically interacting species.

4. The laser system of claim 1, wherein said electronics includes a galvanometer for measuring a potential difference between two points separated by a volume of material including the optically interacting species filling the module.

5. The laser system of claim 1, wherein the module is a galvatron.

6. The laser system of claim 5, wherein said electronics include a photodetector for measuring an intensity of the output beam after the output beam traverses the material including the optically interacting species filling the galvatron.

7. The laser system of claim 5, wherein a current is flowed between the anode and the cathode to cause material of the cathode to fill the galvatron in gaseous form.

8. The laser system of claim 5, wherein said electronics measure a phtotabsorption by said species of said beam portion.

9. The laser system of claim 1, wherein said module is external to said resonator.

10. The laser system of claim 1, wherein said module is within said resonator.

11. The molecular flue laser system of claim 1, wherein the at least one species includes one or more species selected from the group consisting of selenium and silicon.

12. The molecular fluorine laser system of claim 11, wherein the group of species further consists of bromine.

13. The laser system of claim 11, wherein said module further contains an inert gas.

14. The laser system of claim 11, wherein said laser system further includes a photodetector for measuring an intensity of the output beam after the output beam traverses a volume of the module including the optically interacting species.

15. The laser system of claim 14, wherein said photodetector measure a phtotabsorption by said species of said beam portion.

16. The laser system of claim 11, wherein said laser system further includes a galvanometer for measuring a potential difference between two points separated by a volume of material including the optically interacting species filling the module.

17. The laser system of claim 11, wherein the module is a galvatron.

18. The laser system of claim 17, wherein said electronics include a photodetector for measuring an intensity of the output beam after the output beam traverses the material including the optically interacting species filling the galvatron.

19. The laser system of claim 17, wherein a current is flowed between an anode and a cathode of said galvatron to cause material of the cathode to fill the galvatron in gaseous form.

20. The laser system of claim 11, wherein said module is external to said resonator.

21. The laser system of claim 11, wherein said module is within said resonator.

22. The molecular fluorine laser system of claim 1, said module containing a species having a plurality of optical transition lines with the emission spectrum of said molecular fluorine laser system for optically interacting with a beam portion in a region around 157 nm, said laser system being configured to measure effects of interaction of the species with he beam portion as the wavelength of the narrow baud output beam is scanned through the plurality of optical transition lines.

23. The molecular fluorine laser system of claim 22, wherein the species having said optical transition around 157 nm includes at least one species selected from the group of species consisting of selenium and silicon.

24. The molecular fluorine laser system of claim 22, wherein the species having said optical transition around 157 nm includes at least one species selected from the group of species consisting of selenium, bromine and silicon.

25. The method of claim 22, wherein said species includes at least one species selected from the group of species consisting of selenium, platinum and silicon.

26. A method for determining the absolute wavelength of a narrowed spectral emission around 157 nm of a narrow band laser system including a wavelength selection and tuning unit for selecting one of multiple closely-spaced characteristic molecular fluorine emission lines around 157 nm by optically suppressing non-selected lines of The multiple closely-spaced characteristic molecular fluorine emission lines, and for tuning a central wavelength of the arrow band output beam from the laser within the selected line, a wavelength calibration system including a module containing a medium including at least one optically interacting species having one or more optical transition lines within the emission spectrum of said laser, and a wavelength monitoring module calibrated to the one or more optical transition lines of the medium contained within said module of said wavelength calibration system, comprising the steps of:
providing a narrow band output laser beam around 157 nm from said laser system;
directing said output beam through the module including said optically interacting species;
detecting at least one of the optical transition lines when the narrowed emission is tuned within the emission spectrum of the laser;
determining the absolute wavelength of the narrowed emission at at least one tuning position corresponding o at least one of the one or more optical transition lines based on the at least one detected transition;
calibrating the wavelength monitoring module based on the absolute wavelength determination; and
tuning the wavelength of the narrowed spectral emission to a desired wavelength by controlling the wavelength selection and tuning unit according to information received from the wavelength monitoring module which is calibrated to the absolute wavelength standard, such that the wavelength is moved away from an interaction wavelength with the absolute wavelength standard based on information received from the wavelength monitoring module as the wavelength is tuned to the desired wavelength within the selected line of the multiple closely-spaced characteristic molecular fluorine emission lines around 157 nm.

27. The method of claim 26, wherein said optically interacting species includes selenium.

28. The method of claim 26, wherein the optically interacting species includes bromine.

29. A method of claim 26, wherein the optically interacting species includes silicon.

30. The method of claim 26, wherein the detecting step includes detecting a plurality of optical transition lines when the narrowed emission is tuned within the emission spectrum of the laser.

31. The method of claim 30, wherein said optically interacting species includes selenium.

32. The method of claim 30, wherein the optically interacting species includes bromine.

33. A method of claim 3, wherein the optically interacting species includes silicon.

34. The method of claim 26, wherein said species includes at least one species selected from ale group of species consisting of selenium and silicon.

35. The method as in claim 34, the group of species further consisting of bromine.

36. The method of claim 26, wherein said species having said at least one optical inter-level transition within the broadband emission spectrum of said excimer laser is platinum.

37. The method of claim 26, wherein said species includes at least one species selected from the group of species consisting of selenium, silicon, platinum bromine.

38. A method for determining the absolute wavelength of a narrowed spectral emission of a narrow band gas discharge laser system including a gas mixture comprising molecular fluorine, a wavelength selection and tuning unit for selecting one of multiple closely-spaced characteristic molecular fluorine emission lines around 157 nm by optically suppressing non-selected lines of the multiple closely-spaced characteristic molecular fluorine: emission lines, and for tuning a central wavelength of the narrow band output beam from the laser within the selected line, a wavelength calibration system including a module containing a medium including an optically interacting species having an optical transition line within the emission spectrum of said laser, and a wavelength monitoring module calibrated to the one or more optical transition lines of the medium contained within said module of said wavelength calibration system, comprising the steps of:
providing a narrow band output laser beam from said excimer or molecular fluorine laser system;
directing said output beam through the module including said optically interacting species;
detecting the optical transition line when the narrowed emission is tuned within the emission spectrum of the laser; and
determining the absolute wavelength of the narrowed emission based on the detected transition;
calibrating the wavelength monitoring module based on the absolute wavelength determination; and
tuning the wavelength of the narrowed spectral emission to a desired wavelength by controlling the wavelength selection and tuning unit according to information received from the wavelength monitoring module which is calibrated to the absolute wavelength standard, such that the wavelength is moved away from an interaction wavelength with The absolute wavelength standard based on information received from the wavelength monitoring module as the wavelength is tuned to the desired wavelength with the selected line of the multiple closely-spaced characteristic molecular fluorine emission lines around 157 nm, and
wherein said optically interacting species includes platinum.

39. The method of claim 38, wherein the detecting step comprises detecting a plurality of optical transition lines when The narrowed emission is tuned within the emission spectrum of the laser.

40. The laser system of claim 38, wherein said module further contains an inert gas.

41. The laser system of claim 40, wherein said inert gas includes neon.

42. The laser system of claim 38, further comprising a photodetector for measuring an intensity of the output beam after the output beam traverses a volume of the module including the optically interacting species.

43. The laser system of claim 38, further comprising a galvanometer for measuring a potential difference between two points separated by a volume of material including the optically interacting species filling the module.

* * * * *